United States Patent [19]

Pierce et al.

[11] Patent Number: 5,160,367
[45] Date of Patent: Nov. 3, 1992

[54] SALT TRANSPORT EXTRACTION OF TRANSURANIUM ELEMENTS FROM LWR FUEL

[75] Inventors: R. Dean Pierce, Naperville; John P. Ackerman, Downers Grove; James E. Battles, Oak Forest; Terry R. Johnson, Wheaton; William E. Miller, Naperville, all of Ill.

[73] Assignee: The United States of America as represented by the United States Department of Energy, Washington, D.C.

[21] Appl. No.: 770,385

[22] Filed: Oct. 3, 1991

[51] Int. Cl.[5] .............................. C22B 60/00
[52] U.S. Cl. ........................ 75/397; 75/399; 423/5; 423/21.1; 423/22; 423/23; 423/155; 423/179; 423/250; 423/251; 423/253
[58] Field of Search ............... 75/397, 395, 399; 252/627; 423/5, 21.1, 250, 251, 253, 22, 23, 155, 179, 11; 204/1.5

[56] References Cited

U.S. PATENT DOCUMENTS

| | | | |
|---|---|---|---|
| 3,011,865 | 12/1961 | Benedict et al. | 423/5 |
| 3,023,097 | 2/1962 | Burris, Jr. et al. | 75/399 |
| 3,030,176 | 4/1962 | Lyon | 423/5 |
| 3,147,109 | 9/1964 | Knighton et al. | 75/397 |
| 3,154,379 | 10/1964 | Benedict et al. | 423/5 |
| 3,282,681 | 11/1966 | Knighton et al. | 75/397 |
| 3,284,190 | 11/1966 | Knighton et al. | 75/399 |
| 3,607,145 | 9/1971 | Weng | 423/11 |
| 4,814,046 | 3/1989 | Johnson et al. | 204/1.5 |
| 5,041,193 | 8/1991 | Grantham | 204/1.5 |

*Primary Examiner*—Brooks H. Hunt
*Assistant Examiner*—Ngoclan T. Mai
*Attorney, Agent, or Firm*—James W. Weinberger; Thomas G. Anderson; William R. Moser

[57] ABSTRACT

A process of separating transuranium actinide values from uranium values present in spent nuclear oxide fuels which contain rare earth and noble metal fission products. The oxide fuel is reduced with Ca metal in the presence of $CaCl_2$ and a Cu—Mg alloy containing not less than about 25% by weight Mg at a temperature in the range of from about 750° C. to about 850° C. to precipitate uranium metal and some of the noble metal fission products leaving the Cu—Mg alloy having transuranium actinide metals and rare earth fission product metals and some of the noble metal fission products dissolved therein. The $CaCl_2$ having CaO and fission products of alkali metals and the alkali earth metals and iodine dissolved therein is separated and electrolytically treated with a carbon electrode to reduce the CaO to Ca metal while converting the carbon electrode to CO and $CO_2$. The Ca metal and $CaCl_2$ is recycled to reduce additional oxide fuel. The Cu—Mg alloy having transuranium metals and rare earth fission product metals and the noble metal fission products dissolved therein is contacted with a transport salt including $Mg\ Cl_2$ to transfer Mg values from the transport salt to the Cu—Mg alloy while transuranium actinide and rare earth fission product metals transfer from the Cu—Mg alloy to the transport salt. Then the transport salt is mixed with a Mg—Zn alloy to transfer Mg values from the alloy to the transport salt while the transuranium actinide and rare earth fission product values dissolved in the salt are reduced and transferred to the Mg—Zn alloy.

30 Claims, 2 Drawing Sheets

SALT TRANSPORT EXTRACTION OF TRANSURANIUM ELEMENTS FROM LWR FUEL

CONTRACTUAL ORIGIN OF THE INVENTION

The United States Government has rights in this invention pursuant to Contract No. W-31-109-ENG-38 between the U.S. Department of Energy and The University of Chicago representing Argonne National Laboratory.

BACKGROUND OF THE INVENTION

This invention relates to a pyrochemical process for converting spent oxide nuclear fuel from a light water reactor to metal and for separating plutonium and higher actinide metals such as americium, neptunium and curium from the bulk uranium. Because the end product is for use in a integrated fast reactor (IFR), high decontamination of the separate streams from fission products is not a prime concern nor is the total separation of plutonium americium, neptunium and curium (hereinafter transuranic elements) from the bulk uranium. The transuranic elements will be used to make core fuel for a liquid metal fast breeder (LMFBR) particularly of the new IFR or integrated fast reactor type. Because of the purpose for which this reprocessed fuel will be used, some uranium can accompany the plutonium stream since the uranium to plutonium ratio in a LMFBR fuel is in the range of 2-3.5:1. The bulk uranium or uranium rich product stream is to be stored for later use, for instance as a uranium source for breeder blankets in a liquid metal fast breeder reactor (LMFBR), when and if such fast reactors are commercially viable. A goal of the process is to remove approximately 90% of the transuranic actinides from the uranium so that the transuranic actinides can be used as core fuel and the remaining uranium can be used as blanket material.

Accordingly, it is an object of the invention to provide a process for separating transuranic or transuranium actinide values from spent oxide nuclear fuel while reducing the amount of nuclear waste material which has to be treated and stored.

Another object of the invention is to provide a process using various combinations of alloys and molten salts selectively to separate uranium from the transuranic values present in spent nuclear oxide fuel and to reuse the alloys and the salts several times in order efficiently to separate the desired values while producing a very small amount of nuclear waste.

A still further object of the invention is to provide a process of separating transuranium actinide values from uranium values present in spent nuclear oxide fuels containing rare earth and noble metal fission products as well as other fission products, comprising reducing the oxide fuel with Ca metal in the presence of Ca halide and a molten Cu—Mg alloy to precipitate uranium metal and some of the noble metal fission products leaving the Cu—Mg alloy having transuranium actinide metals and rare earth fission product metals and some of the noble metal fission products dissolved therein and leaving Ca halide having fission products of alkali metals and the alkali earth metals and iodine dissolved therein, separating the Ca halide and the fission products contained therein from the uranium metal and Cu—Mg alloy, oxidizing any Ca metal present in the Cu—Mg alloy to the halide and separating same from the Cu—Mg alloy, contacting the Cu—Mg alloy having transuranium metals and rare earth fission product metals and the noble metal fission products dissolved therein with a transport salt including Mg halide to transfer Mg values from the transport salt to the Cu—Mg alloy while transuranium actinide and rare earth fission product metals transfer from the Cu—Mg alloy to the transport salt, contacting the transport salt having the transuranium actinide and rare earth fission product values dissolved therein with a Mg-containing alloy to transfer Mg values from the alloy to the transport salt while the transuranium actinide and rare earth fission product values dissolved in the salt are reduced and transferred to the Mg-containing alloy, whereby an alloy is formed having transuranium actinide and rare earth fission product values therein while precipitated uranium values along with precipitated noble metal fission product metals are available for separation from the Cu—Mg alloy.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1A:
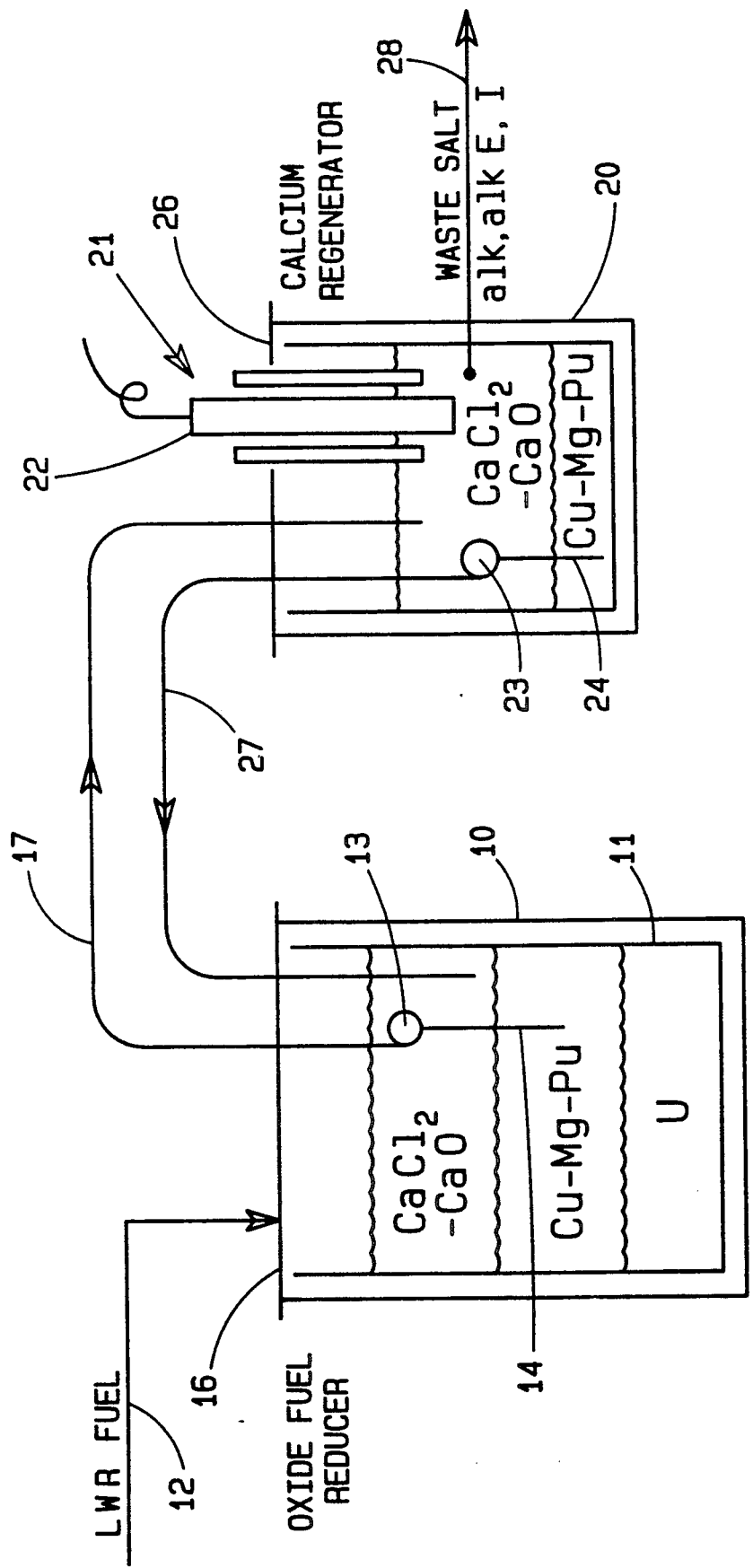
FIG. 1a and 1b is a schematic diagram for illustrating the process of the present invention.
Figure 1B:
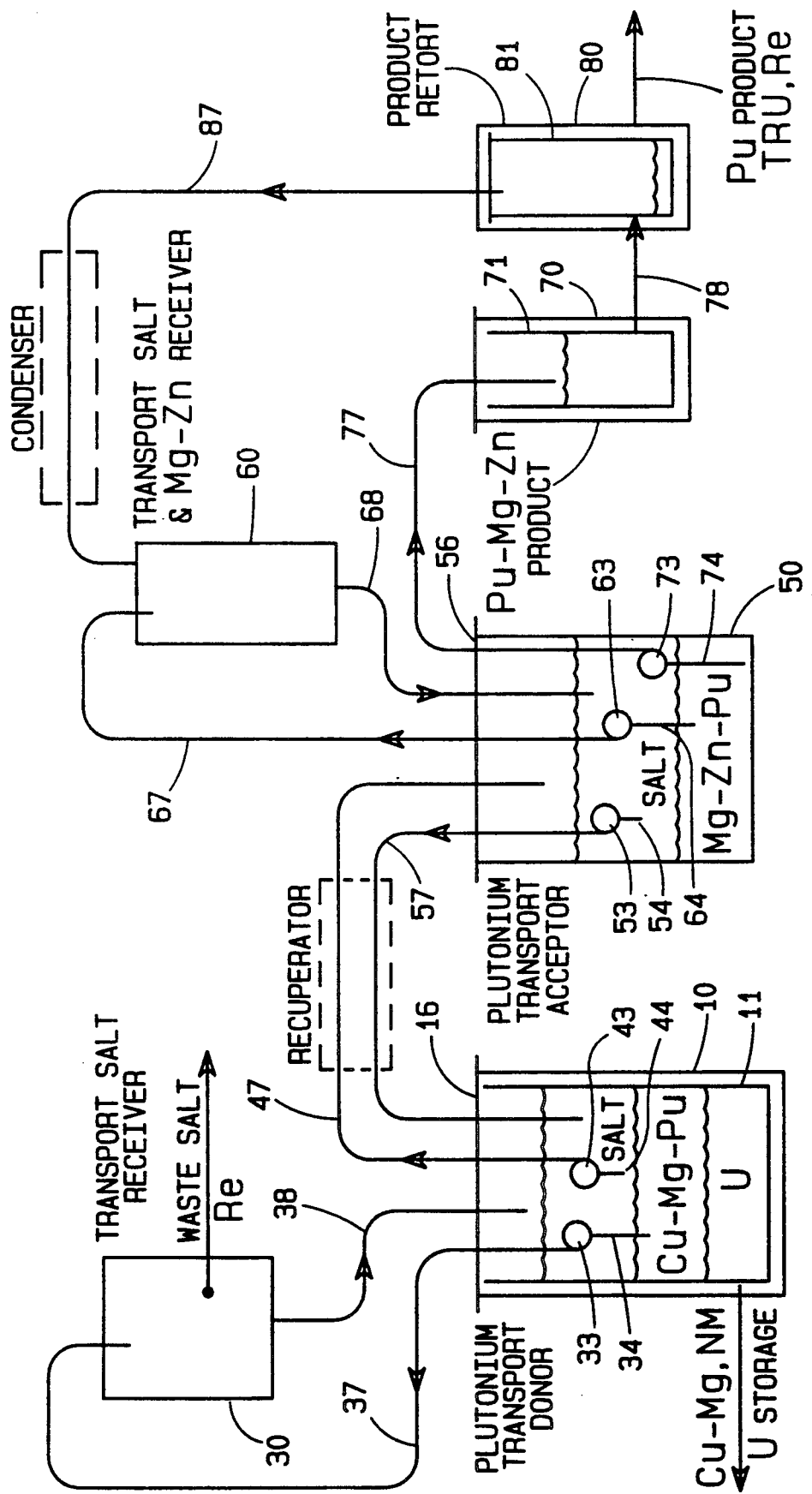

The inventive process begins with spent nuclear oxide fuel from a light water reactor which has been mechanically declad such that the product of the decladding is the oxide pellet and/or oxide particulate which is used as a process feed. The process feed is introduced into an oxide reduction vessel 10 and particularly into a crucible 11 in the vessel 10 by means of an inlet line 12. In the vessel 10 is a two-phase system consisting of a copper magnesium molten alloy on top of which are liquid calcium metal and a liquid calcium chloride salt, the entire vessel 10 being maintained at a temperature in the range of from about 750° C. to about 850° C. with the preferred temperature range being about 800° C. to about 850° C. As the oxide fuel is introduced into the vessel 10 and mixed by mechanism (not shown), the oxides are reduced by reaction with the liquid calcium to form calcium oxide which dissolves in the calcium chloride salt, producing the uranium and transuranic metals along with noble metal fission products. Uranium has little solubility in the copper magnesium alloy and therefore precipitates as a solid since the melting point of uranium is about 1150° C. Alkali metal and alkaline earth metal and iodine fission products which are reduced by the calcium dissolve as chlorides in the calcium chloride salt phase whereas the transuranic actinides including plutonium dissolve in the copper-magnesium alloy phase along with rare earth fission product metals and a portion of the noble metal fission products. Another portion of the noble metal fission products stay with the uranium and precipitate out.

The preferred alloy used in this phase of the separation is a copper 35% by weight magnesium alloy. However, a copper-magnesium alloy may be used wherein the magnesium is present anywhere in the range of from about 25% by weight to about 60% by weight. After reduction of the oxide fuel, a three phase system exists within the vessel 10. Uranium and some of the noble metal fission products precipitate to the bottom of the vessel. Floating on top of the uranium is the copper magnesium alloy having dissolved therein the transuranic actinides along with the rare earth metals and some of the noble metal fission products remain in the alloy. The salt phase includes the dissolved calcium oxide which is the product of the reduction of the oxide fuel along with the alkali metal and alkaline earth metal and iodine fission products which migrate to the salt as chlorides. After the reduction in vessel 10 is complete, the calcium chloride salt containing dissolved calcium oxide is transported by means of a pump 13 having inlet pipe 14 vertically movable among the various phases in the vessel 10. The pump 13 is connected on the output side to a line 17 which leads to a calcium regenerator vessel 20.

The oxide fuel reduction vessel 10 is provided with a top 16 so as to close the vessel 10 during the reaction therein, the top being provided with fittings and the like (not shown) to accommodate the various lines into and out of the vessel as explained. The calcium regenerator vessel 20 includes an electrochemical mechanism 21 having a carbon electrode 22 connected to a source of electrical power (not shown). A line 17 from the oxide fuel reduction vessel 10 leads to the vessel 20 wherein it receives the calcium chloride salt having the calcium oxide dissolved therein along with the alkali metal and alkaline earth fission product chlorides which have dissolved in the calcium salt during the reduction of the oxide fuel in vessel 10. In order to be certain that all of the calcium is transferred from the vessel 10, a small portion of the copper-magnesium actinide-containing alloy is also transferred to the calcium regenerator 20. A calcium-zinc alloy could be used as an alternative to the copper-magnesium alloy in order to accumulate the calcium metal produced during operation of the electrochemical mechanism 21 in the vessel 20. The mechanism 21 includes a liquid metal, preferably Zn, cathode and a porous screen surrounding the carbon anode to prevent particulate carbon particles from contaminating the $CaCl_2$ salt. Vessel 20 is provided with a top 26 so as to close the vessel during the reaction therein, the top being provided with fittings and the like to accommodate the various lines into and out of the vessel as explained.

Upon operation of the electrochemical mechanism 21 in a well known manner, carbon monoxide and carbon dioxide are produced as the carbon electrode 22 is consumed while calcium metal is produced during the reduction of calcium oxide at the electrode 22. The calcium metal produced by the electrolytical process is taken up either in the coppermagnesium alloy from the vessel 10 or by the alternative calcium-zinc alloy, into either of which the calcium will dissolve. If a calcium-zinc alloy is used, then the zinc must be retorted from the alloy involving another step. After regeneration of the calcium oxide to calcium metal in vessel 20 is complete the portion of the calcium chloride salt containing the alkali metal, alkaline earth metal and iodine fission product, are sent to storage via line 28 while the remainder of the salt and the copper-magnesium alloy containing the dissolved calcium metal are transported back to vessel 10 by means of a pump 23 having an inlet pipe 24 vertically movable among the various phases in the vessel 20. The pump 23 is connected on the output side to a line 27 which leads to vessel 10. Accordingly, the preferred alloy used to accumulate the calcium metal produced during the destruction of the carbon electrode 22 is the copper-magnesium alloy used in the reduction vessel 10.

The liquid metal alloy phase left in the vessel 10 after the calcium chloride salt has been pumped into the calcium regenerator 20 is treated with a copper chloride salt to convert any remaining or residual amount of calcium left in the reduction alloy to calcium chloride. The product of this reduction reaction is metallic copper which dissolves in the copper-magnesium alloy. After all of the calcium metal has been removed from the copper-magnesium alloy in the reduction vessel 10, a transport salt is brought into contact with the alloy from a transport salt storage vessel 30 which is in fluid communication with the reduction vessel 10 by means of a pump 33 having a inlet pipe 34 connected to a line 37 which is in communication with the vessel 30 and an outlet line 38 which leads to the vessel 10, again operating through fittings in the top 16 in which are not shown.

Preferably, the transport salt is a magnesium-containing salt and may be a variety of magnesium halides, the chloride being preferred. Still more preferred is a mixture of calcium chloride and magnesium chloride wherein the transport salt is at least 20% mole magnesium chloride. Other alternatives for the transport salt are combinations of magnesium chloride, sodium chloride and potassium chloride in a preferred mole ratio of 50% magnesium chloride, 30% sodium chloride and 20% potassium chloride. One Hundred percent magnesium chloride is also a preferred embodiment for the transport salt. The transport salt serves to transport the transuranic actinide metals present in the liquid copper-magnesium alloy to another vessel wherein a reduction reaction will occur. To that end, a transuranic actinide transport vessel 50 is provided with a cover 56 through which various lines extend, the vessel 50 being provided with a pump 53 having an inlet pipe 54 and an outlet line 57 leading to the vessel 10. In addition, a pump 63 having an inlet pipe 64 and outlet line 67 is connected to a transport salt holding vessel 60 which is provided with an outlet line 68 leading to the vessel 50. Finally, a pump 73 having an inlet pipe 74 and an outlet line 77 leads to and is in fluid communication with a transuranic product vessel 70 which is provided with a crucible 71 for receiving product, as will be described, and an outlet line 78 leading to a retort vessel 80 having a crucible 81 positioned therein and a line 87 leading to the transport salt holding vessel 60.

With the transport salt of magnesium chloride, or of magnesium chloride and calcium chloride pumped to the vessel 10, a oxidation reaction takes place upon mixing of the magnesium transport salt with the copper-magnesium alloy containing the transuranic actinide values. During mixing at elevated temperatures, preferably about 800° C., the transuranic actinide values present as metals in the copper-magnesium alloy are oxidized to the transport salt while magnesium ions in the salt are reduced to the metal which dissolves in the alloy. The reaction is for the actinide metals in the alloy to form the chlorides while the magnesium chloride is reduced to the metal. Thereafter, the pump 43 is used to pump the transport salt from the vessel 10 through line 47 into the vessel 50, where an acceptor alloy, preferably of a magnesium-zinc alloy although it may be magnesium-cadmium alloy, is in the vessel 50 for intimate contact with the transport salt having the transuranic actinide values dissolved therein. It should be remembered that the rare earth fission products tend to transport with the transuranic actinides from the copper-magnesium alloy and some noble metals fission products which are in the alloy tend to transfer also, but most of the noble metals stay with the copper-magnesium alloy or the precipitated uranium alloy. As is readily understood, there is a magnesium build-up in the copper-magnesium alloy which can be rectified by retorting magnesium and transferring same to the magnesium-zinc alloy by a process which is well known and not shown herein.

An important aspect of the invention is that no radioactive waste is created by the transport of the transuranic actinide values as described herein. After the magnesium chloride containing salt with the transuranic actinide values has been in intimate contact with the magnesium-zinc alloy, a reduction reaction occurs wherein the transuranic actinide values are reduced from the chloride to the metal and dissolve in the magnesium-zinc alloy while the magnesium values transfer from the magnesium-zinc alloy to the transport salt. The magnesium-zinc alloy has magnesium present in the range of from about 5% by weight to about 15% by weight and preferably about 10% by weight. If a magnesium-cadmium alloy is used instead of the magnesium-zinc alloy, then magnesium is present in the range of from about 5% to about 10% by weight. The magnesium-zinc alloy is preferred because it has a melting point such that the vessel 10 and the reaction contained therein will be operated at the same temperature as the vessel 50 and there is n need for adding heat to or taking heat away from the reaction vessels.

After the reduction is completed in vessel 50, the magnesium-zinc alloy having the transuranic actinide metals dissolved therein is transferred by means of the pump 73 into the vessel 70 and particularly into the crucible 71 and from there is transferred to a retort vessel 80 wherein the magnesium-zinc alloy is retorted from the higher boiling plutonium and other actinide products which are then later processed into fuel for a breeder reactor.

The $CaCl_2$-containing salt may be used in up to fifty batches before sufficient quantities of alkali earth metal and alkali metal fission products have accumulated in the salt such that the heat generated exceeds present regulatory limitations for storage of this radioactive material. Accordingly, a significant number of batches of oxide fuel can be processed by this process without using additional calcium chloride salt or contributing to the amount of nuclear waste material which must be safely stored. The uranium is accumulated in vessel 10 from successive batch operations until sufficient uranium has been accumulated to store this material for later use as breeder blanket material. Uranium recovery can be performed by various methods, such as by salt transport or by retorting the copper-magnesium alloy to cast a copper-uranium anode for later electrolytic recovery of the uranium. A radioactive waste product which requires disposal from the system, in addition to the calcium chloride salt, is some of the copper-magnesium alloy which has to be separated as a waste to accommodate the continual build up of the noble metal fission products, but this is a small price to pay for the amount of oxide fuel reprocessed.

As is understood from the explanation herein, the process is essentially a batch process which may be repeated a number of times. The size of each batch cycle is limited to the amount of plutonium which may be concentrated in pure form from each batch. The reduction batch may be larger but the salt transport portion is limited to approximately 3 kilograms of plutonium in any single batch because of criticality considerations. Because the amount of plutonium produced in the oxide fuel, which is about 0.9 weight percent and the 3 kilogram limitation, each batch of oxide fuel from a LWR reactor reprocessed by the inventive process in about 333 kilograms.

While there has been disclosed what is considered to be the preferred embodiment of the present invention, it is understood that various changes in the details may be made without departing from the spirit, or sacrificing any of the advantages of the present invention.

The embodiments of the invention in which an exclusive property of privilege is claimed are defined as follows:

1. A process of separating transuranium actinide values from uranium values present in spent nuclear oxide fuels containing rare earth and noble metal fission products as well as fission products of alkali metals, the alkaline earth metals and iodine, comprising reducing the oxide fuel with Ca metal in the presence of Ca halide and a molten Cu—Mg alloy to precipitate uranium values and some of the noble metal fission products leaving the Cu—Mg alloy having transuranium actinide values and rare earth fission product values and some of the noble metal fission products dissolved therein and leaving Ca halide having fission products of alkali metals and the alkaline earth metals and iodine dissolved therein, separating the Ca halide and the fission products contained therein from the uranium values and Cu—Mg alloy, oxidizing any Ca metal present in the Cu—Mg alloy to the halide and separating same from the Cu—Mg alloy, contacting the Cu—Mg alloy having transuranium actinide values and rare earth fission product values and the noble metal fission products dissolved therein with a transport salt including Mg halide to transfer Mg values from the transport salt to the Cu—Mg alloy while transuranium actinide and rare earth fission product values transfer from the Cu—Mg alloy to the transport salt, contacting the transport salt having the transuranium actinide and rare earth fission product values dissolved therein with a Mg-containing alloy to transfer Mg values from the alloy to the transport salt while the transuranium actinide and rare earth fission product values dissolved in the salt are reduced and transferred to the Mg-containing alloy, whereby an alloy is formed having transuranium actinide and rare earth fission product values therein while precipitated uranium values along with precipitated noble metal fission product values are available for separation from the Cu—Mg alloy.

2. The process of claim 1, wherein the Ca halide includes $CaCl_2$.

3. The process of claim 1, wherein the Cu—Mg alloy has Mg present in the range of from about 25% to about 60% by weight.

4. The process of claim 3, wherein Mg is present in an amount of about 35% by weight.

5. The process of claim 1, wherein any Ca metal present in the Cu—Mg alloy is oxidized by contact with Cu halide salt producing Cu metal which dissolves in the Cu—Mg alloy.

6. The process of claim 5, wherein the Cu halide is $CuCl_2$.

7. The process of claim 1, wherein the transport salt contains $MgCl_2$.

8. The process of claim 7, wherein the transport salt contains 80 mole percent $CaCl_2$ with the balance $MgCl_2$.

9. The process of claim 8, wherein the transport salt contains 80 mole percent $MgCl_2$ and NaCl and KCl.

10. The process of claim 1, wherein the Mg-containing alloy is a Mg—Zn alloy having Mg present in the range of from about 5% to about 15% by weight or a Mg—Cd alloy having Mg present in the range of from about 5% to about 10% by weight.

11. A process of claim 10, wherein Mg is present in the Mg—Zn alloy in an amount of about 10% by weight.

12. The process of claim 10, wherein the alloys are maintained at a temperature in the range of from about 750° C. to about 850° C. during transfer of values into and out of the alloys.

13. A process of separating transuranium actinide values from uranium values present in spent nuclear oxide fuels containing rare earth and noble metal fission products as well as fission products of alkali metals, alkaline earth metals and iodine, comprising reducing the oxide fuel with Ca metal in the presence of Ca halide and a Cu—Mg alloy containing not less than about 25% by weight Mg at a temperature in the range of from about 750° C. to about 850° C. to precipitate uranium values and some of the noble metal fission products leaving the Cu—Mg alloy having transuranium actinide values and rare earth fission product values and some of the noble metal fission products dissolved therein and leaving Ca halide having CaO and fission products of alkali metals and the alkaline earth metals and iodine dissolved therein, separating the Ca halide with CaO and the fission products contained therein from the uranium values and Cu—Mg alloy and electrolytically contacting the calcium salts with a carbon electrode to reduce the CaO to Ca metal while converting the carbon electrode to CO and $CO_2$ and thereafter recycling the Ca metal and Ca halide salt to reduce additional oxide fuel, oxidizing any remaining Ca metal present in the Cu—Mg alloy to the halide and separating same from the Cu—Mg alloy and recycling the Ca halide for use in reducing the next batch of oxide fuel, contacting the Cu—Mg alloy having transuranium actinide values and rare earth fission product values and the noble metal fission products dissolved therein with a transport salt including Mg halide to transfer Mg values from the transport salt to the Cu—Mg alloy while transuranium actinide values and rare earth fission product values transfer from the Cu—Mg alloy to the transport salt, contacting the transport salt having the transuranium actinide values and rare earth fission product values dissolved therein with a Mg—Zn alloy to transfer Mg values from the alloy to the transport salt while the transuranium actinide and rare earth fission product values dissolved in the salt are reduced and transferred to the Mg—Zn alloy, whereby an alloy is formed having transuranium actinide and rare earth fission product values therein while precipitated uranium values along with precipitated noble metal fission product values are available for separation from the Cu—Mg alloy.

14. The process of claim 13, wherein the Ca halide is $CaCl_2$ and the Cu—Mg alloy has Mg present in the range of from about 25% to about 60% by weight.

15. The process of claim 14, wherein Mg is present in an amount of about 35% by weight.

16. The process of claim 13, wherein Ca remaining in Cu—Mg alloy is oxidized with $CaCl_2$ with the Cu metal produced by the reaction dissolving in the Cu—Mg alloy.

17. The process of claim 13, wherein transport salt is a chloride.

18. The process of claim 13, wherein transport salt contains $MgCl_2$ and $CaCl_2$.

19. The process of claim 13, wherein the Mg—Zn alloy has Mg present in the range of from about 5% to about 15% by weight.

20. The process of claim 13, wherein Mg is present in the Mg—Zn alloy in an amount of about 10% by weight.

21. The process of claim 13, wherein the Cu—Mg alloy and the Mg—Zn alloy are maintained at a temperature not less than about 800° C. during the separation process.

22. A process of separating transuranium actinide values from uranium values present in successive batches of spent nuclear oxide fuels containing rare earth and noble metal fission products, as well as fission products of alkali metals, the alkaline earth metals and iodine, comprising introducing the spent nuclear oxide fuel into a fuel reduction vessel having a removable crucible containing Ca metal in the presence of $CaCl_2$ and a molten Cu—Mg alloy having not less than about 25% by weight Mg at a temperature in the range of from about 750° C. to about 850° C. to precipitate uranium values and some of the noble metal fission products at the bottom of the crucible leaving the Cu—Mg alloy having transuranium actinide values and rare earth fission product values and some of the noble metal fission products dissolved therein floating on top of the uranium and leaving $CaCl_2$ having CaO and fission products of alkali metals and the alkaline earth metals and iodine dissolved therein floating on top of the Cu—Mg alloy, transporting the $CaCl_2$ with CaO and the fission products dissolved therein from the fuel reduction vessel to a calcium regenerating vessel and electrolytically contacting the calcium salts with a carbon electrode to reduce the CaO to Ca metal while converting the carbon electrode to CO and $CO_2$ and thereafter recycling the Ca metal and the $CaCl_2$ to the fuel reduction vessel to reduce successive batches of spent nuclear oxide fuel, oxidizing may remaining Ca metal present in the Cu—Mg alloy in the fuel reduction vessel to the chloride and transporting same from the fuel reduction vessel leaving the Cu—Mg alloy floating on top of the uranium in the crucible, contacting the molten Cu—Mg alloy having transuranium actinide values and rare earth fission product values and some of the noble metal fission products dissolved therein with a molten transport salt including $MgCl_2$ to transfer Mg values from the transport salt to the molten Cu—Mg alloy while transuranium actinide and rare earth fission product values are oxidized and transfer from the Cu—Mg alloy to the transport salt as chlorides, transferring the transport salt having the transuranium actinide and rare earth fission product values dissolved therein to a receptor vessel having therein a molten Mg—Zn alloy to transfer Mg values from the Mg—Zn alloy to the transport salt while the transuranium actinide and rare earth fission product values dissolved in the salt are reduced and transferred as metals to the Mg—Zn alloy, separating the transport salt from the Mg—Zn alloy and thereafter distilling the Mg—Zn alloy from the transuranium actinide and rare earth fission product values therein and recycling the Mg—Zn alloy for later contact with the transport salt having transuranium actinide and rare earth fission product values from a successive batch of oxide fuel, the uranium values along with precipitated noble metal fission product values remaining in the reduction vessel to accumulate through successive batches until sufficient values are present whereupon the crucible is removed to storage.

23. The process of claim 22, wherein the $CaCl_2$ salt is recycled between the fuel reduction vessel and the calcium regenerating vessel for each batch of spent nuclear fuel reprocessed and for each such cycle additional fission products of alkali metals and alkaline earth metals and iodine dissolve therein.

24. The process of claim 22, wherein a portion of the Cu—Mg alloy is transported from the reduction vessel to the calcium regeneration vessel to dissolve Ca metal as it is electrolytically produced.

25. The process of claim 22, wherein Ca metal present in the Cu—Mg alloy after reduction of the oxide fuel but before contact with the transport salt is oxidized by contact with $CuCl_2$ producing Cu metal which dissolves in the Cu—Mg alloy.

26. The process of claim 22, wherein the transport salt contains at least 20% by weight $MgCl_2$.

27. The process of claim 22, wherein the transport salt contains $MgCl_2$ and $CaCl_2$.

28. The process of claim 22, wherein the Mg—Zn alloy is maintained at about the same temperature as the Cu—Mg alloy.

29. The process of claim 28, wherein both alloys are maintained at a temperature not less than about 800° C.

30. The process of claim 29, wherein the Cu—Mg alloy contains about 35% by weight Mg and the Mg—Zn alloy contains about 10% by weight mg.

* * * * *